US006614457B1

(12) United States Patent
Sanada et al.

(10) Patent No.: US 6,614,457 B1
(45) Date of Patent: Sep. 2, 2003

(54) FOCUS CONTROL DEVICE THAT MOVES A FOCUS IN A GUI SCREEN

(75) Inventors: Norio Sanada, Kobe (JP); Chihiro Kawahara, Kadoma (JP); Kiyokazu Yamanaka, Ashiya (JP); Hisayuki Kino, Nara-ken (JP)

(73) Assignee: Matsushita Electric Industrial Co., Ltd., Osaka-Fu (JP)

( * ) Notice: Subject to any disclaimer, the term of this patent is extended or adjusted under 35 U.S.C. 154(b) by 0 days.

(21) Appl. No.: 09/427,286

(22) Filed: Oct. 26, 1999

(30) Foreign Application Priority Data

Oct. 27, 1998 (JP) ............................................ 10-305965

(51) Int. Cl.7 .................................................. G09G 5/00
(52) U.S. Cl. ........................................ 345/840; 345/823
(58) Field of Search ................................ 345/767, 768, 345/802, 823, 860, 861, 709, 711, 715, 771, 840, 835; 348/14.05, 14.07, 25, 114, 239

(56) References Cited

U.S. PATENT DOCUMENTS

| | | | | |
|---|---|---|---|---|
| 5,510,811 A | * | 4/1996 | Tobey et al. ................ | 345/157 |
| 5,673,401 A | * | 9/1997 | Volk et al. .................. | 345/763 |
| 5,682,511 A | * | 10/1997 | Sposato et al. ............. | 345/716 |
| 5,687,331 A | * | 11/1997 | Volk et al. .................. | 345/840 |
| 5,990,862 A | * | 11/1999 | Lewis ......................... | 345/858 |
| 6,002,862 A | * | 12/1999 | Takaike ....................... | 703/17 |
| 6,141,003 A | * | 10/2000 | Chor et al. .................. | 345/716 |
| 6,154,205 A | * | 11/2000 | Carroll et al. ............... | 345/716 |
| 6,262,722 B1 | * | 7/2001 | Allison et al. ............... | 345/716 |
| 6,275,268 B1 | * | 8/2001 | Ellis et al. .................. | 348/564 |

FOREIGN PATENT DOCUMENTS

| | | |
|---|---|---|
| GB | 2274233 | 12/1995 |
| JP | 2509062 | 4/1996 |
| WO | 9217835 | 10/1992 |

* cited by examiner

Primary Examiner—Ba Huynh
Assistant Examiner—Tadesse Hailu

(57) ABSTRACT

A focus control device that positions a focus on one of a plurality of graphical user interface (GUI) components displayed on a screen includes request receiving means for receiving a request to move the focus, focus permission information storing means for storing focus permission information indicating, for each GUI component, whether the focus can be positioned on the GUI component, and focus moving means for moving the focus in response to the received request to a GUI component where, according to the focus permission information, the focus can be positioned, the focus moving means skipping over GUI components where the focus cannot be positioned.

12 Claims, 12 Drawing Sheets

FIG. 5

GUI COMPONENT INFORMATION

| GUI COMPONENT ID | COMPONENT TYPE | POSITION | SIZE | CHARACTER STRING |
|---|---|---|---|---|
| L001 | LABEL | (90,60) | (170,40) | "MAIN CATEGORY" |

410

| GUI COMPONENT ID | COMPONENT TYPE | POSITION | SIZE | CHARACTER STRING | FUNCTION | CONTENT GUIDE ID |
|---|---|---|---|---|---|---|
| B001 | BUTTON | (350,270) | (80,40) | "SEARCH" | F_B0010 | NONE |

420

| GUI COMPONENT ID | COMPONENT TYPE | POSITION | SIZE | CHARACTER STRING | FUNCTION | CONTENT GUIDE ID |
|---|---|---|---|---|---|---|
| B003 | BUTTON | (350,420) | (80,45) | "RETURN" | F_B0030 | G_B003 |

430

| GUI COMPONENT ID | COMPONENT TYPE | POSITION | SIZE | IMAGE | FUNCTION | CONTENT GUIDE ID |
|---|---|---|---|---|---|---|
| BM01 | BIT-MAPPED IMAGE | (90,420) | (60,45) | BM0101 | F_BM010 | G_BM01 |

440

· · ·

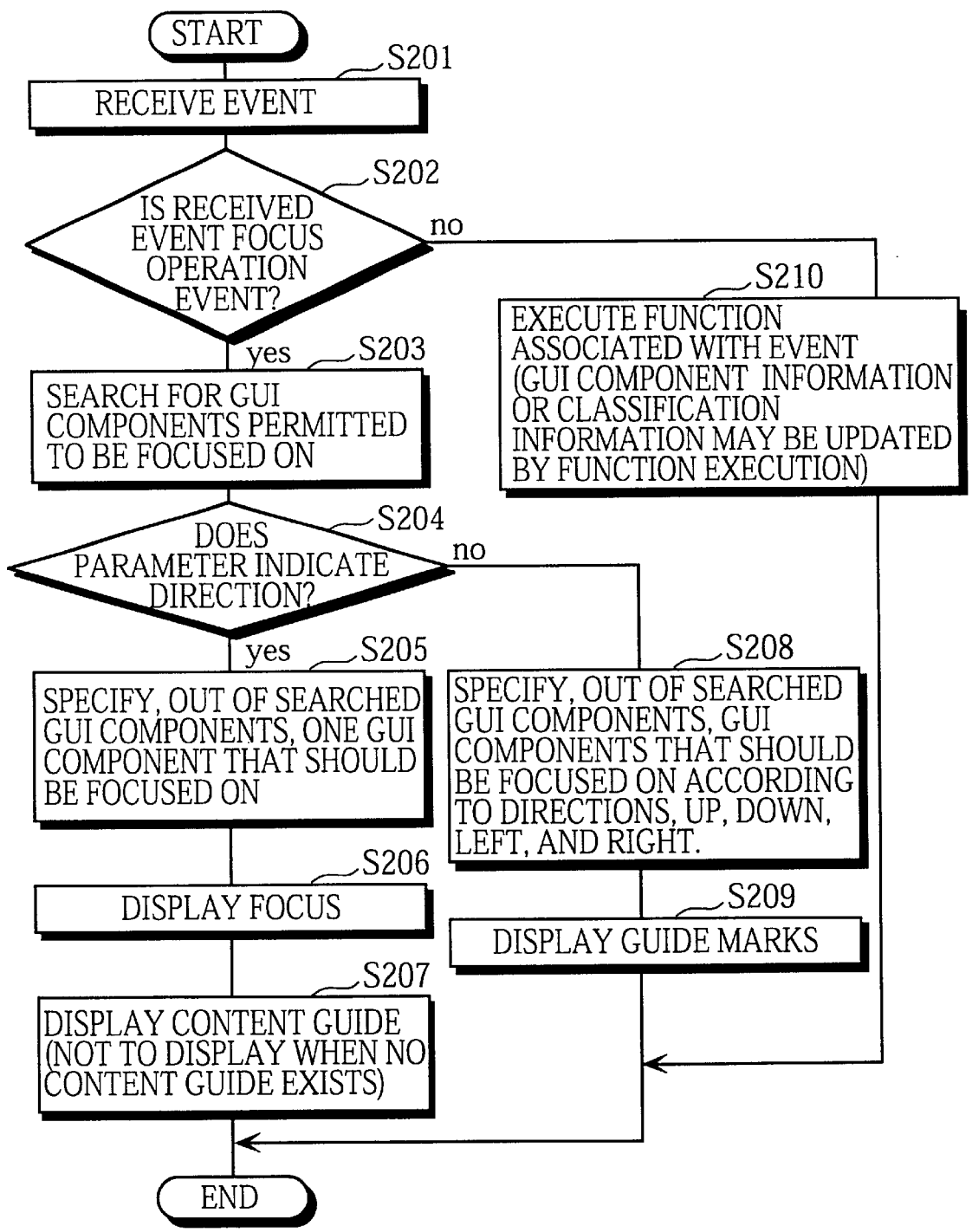

FIG. 12

GUI COMPONENT INFORMATION

| GUI COMPONENT ID | COMPONENT TYPE | FOCUS | POSITION | SIZE | CHARACTER STRING | | |
|---|---|---|---|---|---|---|---|
| L001 | LABEL | NOT PERMITTED | (90,60) | (170,40) | "MAIN CATEGORY" | | |

| GUI COMPONENT ID | COMPONENT TYPE | FOCUS | POSITION | SIZE | CHARACTER STRING | FUNCTION | CONTENT GUIDE ID |
|---|---|---|---|---|---|---|---|
| B001 | BUTTON | PERMITTED | (350,270) | (80,40) | "SEARCH" | F_B0010 | NONE |

| GUI COMPONENT ID | COMPONENT TYPE | FOCUS | POSITION | SIZE | CHARACTER STRING | FUNCTION | CONTENT GUIDE ID |
|---|---|---|---|---|---|---|---|
| B003 | BUTTON | PERMITTED | (350,420) | (80,45) | "RETURN" | F_B0030 | G_B003 |

| GUI COMPONENT ID | COMPONENT TYPE | FOCUS | POSITION | SIZE | IMAGE | FUNCTION | CONTENT GUIDE ID |
|---|---|---|---|---|---|---|---|
| BM01 | BIT-MAPPED IMAGE | PERMITTED | (90,420) | (60,45) | BM0101 | F_BM010 | G_BM01 |

FOCUS CONTROL DEVICE THAT MOVES A FOCUS IN A GUI SCREEN

This application is based on application No. 10-305965 filed in Japan, the content of which is hereby incorporated by reference.

BACKGROUND OF THE INVENTION

(1) Field of the Invention

The present invention relates to graphical user interface (GUI) and more specifically to a technique that facilitates selection of a GUI component such as a button contained in a GUT screen.

(2) Description of the Prior Art

As a growing number of electronic communication appliances and household electrical appliances use screens that contain GUI components as their user interface, the need is increasing for a technique to efficiently and easily design a GUI screen capable of dynamic change such as changes in response to user operation.

GUI screens shown on a display or similar include GUI components that are visual images such as text or a picture, more specifically, a button, a list box, or a check box, given a certain form and a certain property. GUI components present certain information to the user and can be selected by the user. Note that a menu option selectable by a user is also regarded as a GUI component.

A focus displayed on a GUI screen allows the user to point at a given GUI component on the GUI screen using input units such as a keyboard or a remote controller of a TV. This focus is a visual indication showing an area on a GUI screen to which the user is currently referring and is represented, for instance, by a dotted box enclosing the GUI component currently being referred to. Hereafter, when the user has a focus indicate a GUI component to which he is currently referring, the GUI component is said to be "focused on." Such a focus is necessary when the user uses an input unit such as a remote controller or a keyboard that, unlike a pointing device such as a mouse, cannot directly point at a given area on the GUI screen.

A GUI screen control system controls the focus so that the focus moves from one area to another on the GUI screen in response to operations of a button or a key indicating a direction such as up, down, right, or left on a remote controller or a keyboard. When the user presses a button or a key indicating confirmation, the GUI screen control system recognizes a GUI component that is focused on at that point as having been selected by the user and controls the processing according to the properties of the selected GUI component.

Accordingly, to select a GUI component on a GUI screen, the user looks at the GUI screen and repeatedly presses, for instance, direction buttons on the remote controller to move the focus onto the desired GUI component before pressing the confirmation button. In more detail, if the user wants to select the third GUI component to the right of a GUI component currently being focused on, he presses a button on the remote controller indicating a right direction three times and then the confirmation button once to confirm the selection. In this way, although the GUI screen control system enables an input unit such as a remote controller to select a GUI component using a focus, this selection involves more user operations than when the same selection is made with a pointing device that directly points at the same GUI component. The following explains, problems relating to a conventional GUI screen control system.

Some GUI components cannot be selected part or all of the time. However, a conventional GUI screen control system allows GUI components that cannot be selected to be focused on. As a result, the user not only has difficulty in recognizing which GUI components are currently selectable, but also has to repeat a needless operation to move a focus until the focus reaches a selectable GUI: component.

Japanese Laid-Open Patent Application No. 4-817835 discloses a technique that enables the user to recognize GUI components that are options representing functions that are currently available. This is achieved by displaying available GUI components in an animated form and GUT components representing functions that are unavailable in a static form before the user starts selection With this technique, the user can easily recognize currently-selectable GUI components and so select a desired GUI component by moving a focus onto the GUI component via the shortest distance from a GUI component currently being focused on without moving the focus by trial and error.

However, with this conventional technique, several user operations still need to be performed until the focus reaches the desired GUI component via the shortest distance. For instance, even when the user recognizes that the first and second GUI components to the right of a GUI component, currently being focused on are not selectable and wishes to select the third GUI component to the right, the user needs to press a button indicating a right direction three times to move the focus onto the third GUI component.

Accordingly, a technique to enable the user to easily select a desired GUI component using a focus is necessary, especially in a field of household appliances such as ordinary digital TVs that receive user operations using only a remote controller, not a pointing device.

SUMMARY OF THE INVENTION

In order to solve the above problems, the present invention aims to provide a focus control device that moves a focus not onto all the GUI components on a GUI screen but only onto predetermined GUI components to reduce the number of user operations required to move the focus to a desired GUI component using an input unit such as a remote controller.

In order to achieve the above object, the focus control device of the present invention positions a focus on one of a plurality of GUI components displayed on a screen, the focus control device including: a request receiving unit for receiving a request to move the focus; a focus permission information storing unit for storing focus permission information indicating, for each GUI component, whether the focus can be positioned on the GUI component; and a focus moving unit for moving the focus in response to the received request to a GUI component where, according to the focus permission information, the focus can be positioned, the focus moving unit skipping over GUI components where the focus cannot be positioned.

With the stated construction, the focus control device positions the focus only on a GUI component where the focus can be positioned after skipping over GUI components where the focus cannot be positioned. By having the focus permission information indicate that the focus can be positioned on GUI components that are selectable by the user and that the focus cannot be positioned on GUI components that are not selectable, for instance, it becomes possible to reduce a required number of user operations to move the focus to a desired GUI component even when the user uses an input unit such as a remote controller and a keyboard that, unlike a pointing device, cannot directly point at a given GUI component. For example, when the user wants to position the focus on a GUI component two above a GUI component currently focused on and a GUI component immediately above the current GUI component is not selectable, the user can select the desired GUI component by pressing a button indicating the up direction only once to move the focus and a confirmation button to confirm the selection on a remote controller.

Here, each GUI component may be classified into one of a plurality of types, and the focus permission information may indicate whether the focus can be positioned on each GUI component according to the type of the GUI component.

With the stated construction, whether to permit the focus to position on each GUI component can be determined according to the type of the GUI component. By classifying each GUI component into one of a plurality of types according to, for example, its appearance, the user can easily recognize GUI components on which the focus can be positioned by their appearances.

Here, the plurality of types may be determined according to a function and appearance of each GUI component.

With the stated construction, it is possible to classify GUI components according to their appearances and functions into a plurality of GUI component types such as a button, label, and a list box. As a result, the user can recognize GUI components on which the focus can be positioned by their appearances according to GUI component types.

Here, the focus control device may further include a focus permission information changing unit for changing the focus permission information, and the focus moving unit may move the focus according to focus permission information in the focus permission information storing unit when the request receiving unit received the request.

According to the stated construction, focus permission information for certain GUI component types can be changed according to the circumstances. As a result, a GUI that is capable of dynamic change can be achieved.

Here, the focus control device may further include a focus destination display unit for specifying a GUI component to which the focus would move if the request receiving unit received the request and displaying a mark indicating the specified GUI component.

With the stated construction, the focus control device displays a mark indicating a GUI component that would be focused on next if the user moved the focus via a button on a remote controller or the like. Accordingly, the user can easily recognize which GUI component would be focused on.

Here, the focus control device may further include a component position information storing unit for storing position information indicating a display position of each GUI component on the screen, and the request received by the receiving unit may contain information indicating a direction in which the focus should move. The focus moving unit may move the focus by referring to the position information and the indicated direction to specify, out of GUI components on which the focus can be positioned, one GUI component to which the focus should move from a GUI component on which the focus is currently positioned, and by positioning the focus on the specified GUI component.

For the above construction, when the user designates a direction via a button on a remote controller or the like, the focus control device specifies a GUI component that should be focused on out of GUI components where the focus can be positioned, based on the designated direction. By having the focus permission information indicate that the focus can be positioned on GUI components that are selectable by the user, for instance, the user can position the focus on a given selectable GUI component by performing a reduced number of operations.

Here, the focus control device may further include a component position information changing unit for changing the position information, wherein the focus moving unit may move the focus referring to position information in the component position information storing unit when the request receiving unit received the request.

The stated focus control device determines a GUI component that should be focused on according to the position information that is present when receiving a request to move the focus from the user. As a result, even when positions of GUI components have changed, the focus control device will still position the focus only on GUI components where the focus can be positioned. Accordingly, control programs to move a focus in different GUI screens do not need to be provided in the present focus control device, and so the load of designing GUI screens can be reduced.

Here, the focus control device may further include a focus permission information changing unit for changing the focus permission information, wherein the focus moving unit may move the focus referring to focus permission information in the focus permission information storing unit when the request receiving unit received the request.

With the present focus control system, it is possible to change the focus permission information according to circumstances to have the focus permission information indicate that the focus cannot be positioned on certain GUI components. As a result, a GUI that is capable of dynamic change can be achieved.

The above object can be also achieved by a focus control device that is included in a digital broadcast receiving system and that moves a focus to one of a plurality of GUI components that compose a screen, the digital broadcast receiving system receiving a content that is digitally broadcast and displaying, based on information contained in the content, the screen for receiving a user operation, wherein the information in the received content contains focus permission information indicating, for each GUI component, whether the focus can be positioned on the GUI component, and position information indicating a display position of each GUI component on the screen, wherein the focus control device includes: a request receiving unit for receiving, from the user via a remote controller, a request that contains direction information indicating a direction in which the focus should move; a focus permission information obtaining unit for obtaining and storing the focus permission information; and a focus moving unit for referring to the position information and the indicated direction to specify, out of GUI components on which the focus can be positioned, one GUI component to which the focus should move from a GUI component on which the focus is currently positioned, and for moving the focus to the specified GUI component.

With the stated construction, the digital broadcast receiving device is capable of positioning the focus only on predetermined GUI components even when a received content does not contain control information that directly specifies the GUI components to which the focus should move in response to different user operations. Accordingly, by having the focus permission information indicate, for instance, that the focus can be positioned on selectable GUI components, the user can move the focus to a desired selectable GUI component with a reduced number of presses of a button on a remote controller

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 5 shows GUI component information 400 stored in GUI component information management unit 60;

FIG. 6 is a flowchart showing the processing of the focus control device 1;

FIG. 7 is a flowchart showing the processing to specify a GUI component that should be focused on;

FIG. 12 shows contents of modified GUI component information 800 according to the second embodiment.

DESCRIPTION OF THE PREFERRED EMBODIMENTS

FIRST EMBODIMENT

The following describes a focus control device according to the first embodiment with reference to figures.

Construction

Figure 1:
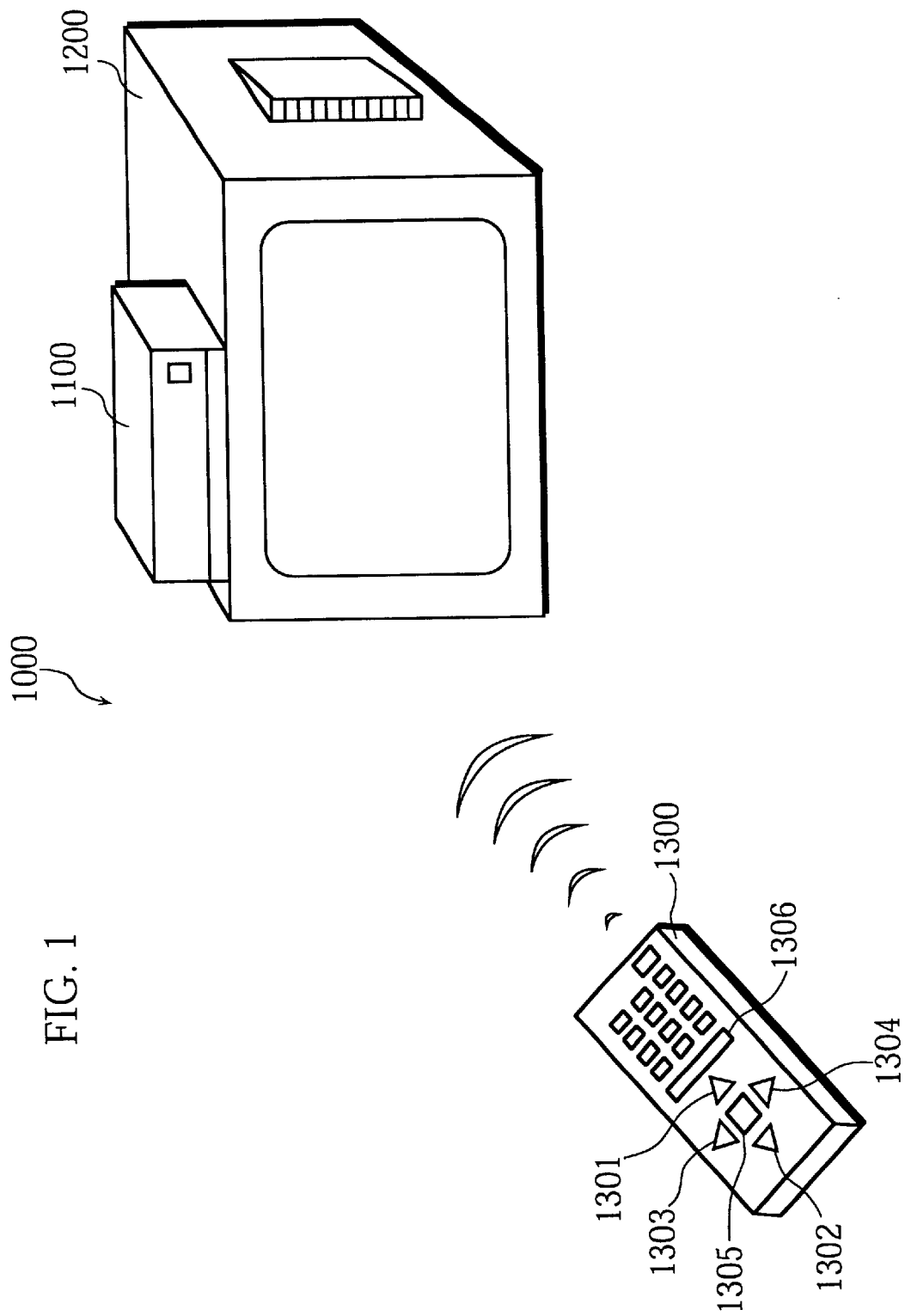
FIG. 1 shows the construction of digital broadcast receiving system 1000 including focus control device 1 according to the first embodiment of the present invention.

FIG. 1 shows a construction of a digital broadcast receiving system 1000 that comprises a focus control device 1 according to the first embodiment.

The digital broadcast receiving system 1000 includes: a digital broadcast receiving device 1100 containing the focus control device 1; a monitor 1200 for displaying data such as a GUI screen; and a remote controller 1300.

The remote controller 1300 contains direction buttons 1300–1304 for indicating four directions composed of up, down, left, and right, a selection button 1305, and a guide mark display button 1306. The remote controller 1300 receives a user operation and transmits the received user operation as an infrared remote-control signal to the digital broadcast receiving device 1100. In this specification, guide marks are indications such as arrows on the screen showing the GUI components to which the focus will move if the user presses one of the direction buttons 1301–1304.

The digital broadcast receiving device 1100 receives a digital broadcast transmitted from a satellite or the like and displays the received broadcast or a GUI screen on the monitor 1200.

Figure 2:
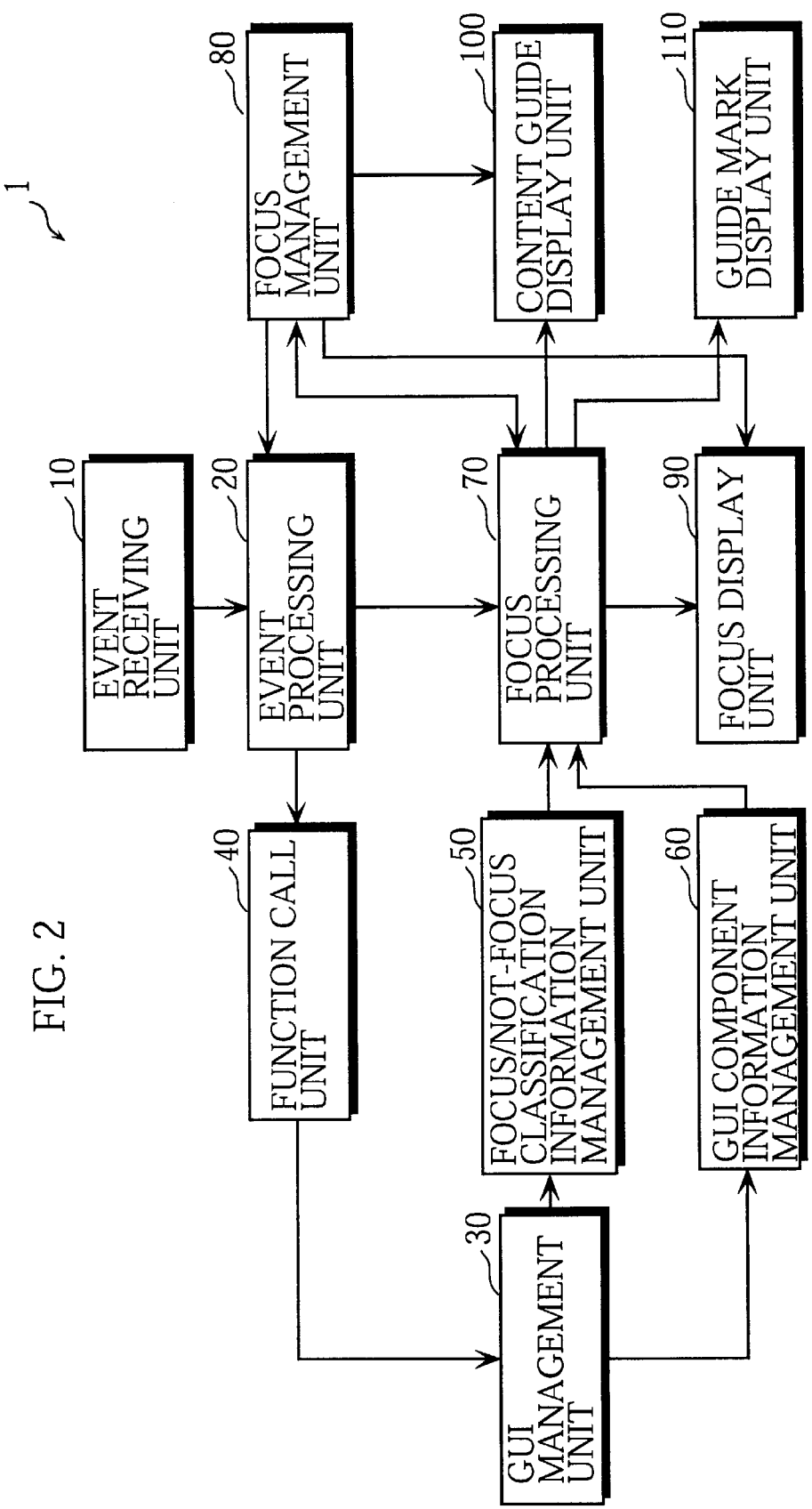
FIG. 2 is a block diagram showing the functional construction of the focus control device 1.

FIG. 2 is a block diagram showing the functional construction of the focus control device 1 of the present embodiment. The focus control device 1 is one of elements of a GUI screen control system in the digital broadcast receiving device 1100. Here, the GUI screen control system is a system for displaying a GUI screen that can receive a user operation, based on information relating to GUI screen display contained in a content that has been received by the digital broadcast receiving device 1100. In terms of hardware, the focus control device 1 is achieved by an information processing system including a CPU, a memory, and the like. As shown in FIG. 2, the focus control device 1 includes the following functional units: an event receiving unit 10, an event processing unit 20, a GUI management unit 30, a function call unit 40, a focus/not-focus classification information management unit 50, a GUI component information management unit 60, a focus processing unit 70, a focus management unit 80, a focus display unit 90, a content guide display unit 100, and a guide mark display unit 110. Functions of these functional units are carried out by having the CPU execute control programs for the functions stored in the memory.

The event receiving unit 10 receives an event that indicates a change in a state of hardware or software of the digital broadcast receiving device 1100. Here, an event may be information containing a parameter. For instance, if the user presses one of the direction buttons 1301–1304 on the remote controller 1300, the event receiving unit 10 receives a focus operation event containing the direction as a parameter via a remote-control signal detection system in the digital broadcast receiving device 1100. Similarly, when the user presses the selection button 1305, the event receiving unit 10 receives a GUI selection event indicating that one GUI component has been selected via the remotecontrol signal detection system, or when the user presses the guide mark display button 1306, the event receiving unit receives a focus operation event containing parameters indicating that guide marks should be displayed.

The event processing unit 20 requests the focus processing unit 70 or the function call unit 40 to perform processing that corresponds to an event that has been received by the event receiving unit 10.

The function call unit 40 invokes a function associated with each event, that is, a control program similar to a subroutine. For example, when a GUI component currently being focused on is selected by the user by pressing the selection button 1305, the function call unit 40 invokes a function that is associated with the selected GUI component. More specifically, if the selected GUI component is a button indicating "Search," the function associated with the button is invoked so that the search is performed.

The focus/not-focus classification information management unit 50 stores focus/not-focus classification information indicating whether each GUI component on a GUI screen can be focused on. This focus/not-focus classification information is received as part of a content that has been digitally broadcast and is stored in the focus/not-focus classification information management unit 50. This focus/not-focus classification information is explained later.

The GUI component information management unit 60 stores GUI component information that defines attributes of each GUI component, such as its contents and a display position. In the same way as the stored focus/not-focus classification information, this GUI component information is received as part of a content that has been digitally broadcast and is stored in the GUI component information management unit 60. The GUI component information is referred to by functional elements such as a system for drawing GUI components aside from the focus control device 1 in the GUI screen control system, and will be explained in detail later.

The GUI management unit 30 manages the focus/not-focus classification information management unit 50 and the GUI component information management unit 60 and makes changes to the focus/not-focus classification information or the GUI component information when necessary as a result of the processing performed by the function call unit 40.

The focus processing unit 70 performs an operation in response to a focus operation event by referring to the focus/not-focus classification information and the GUI component information stored in the focus/not-focus classification information management unit 50 and the GUT component information management unit 60. If the focus operation event contains a parameter indicating either up, down, left, or right direction, the focus processing unit 70 specifies one GUI component that should be focused on according to the direction and notifies the focus management unit 80 of the specified GUI component. The focus processing unit 70 also instructs the focus display unit 90 to display the focus and the content guide display unit 100 to display a content guide on the monitor 1200. The content guide will be explained later. On the other hand, if the focus operation event contains parameters indicating that guide marks should be displayed, the focus processing unit 70 instructs the guide mark display unit 110 to display the guide marks.

The focus management unit 80 stores information that is the ID of the GUI component that has been notified by the focus processing unit 70 and onto which the focus should move. This means that the focus management unit 80 always stores the ID of a GUI component currently being focused on unless processing in response to a focus operation event requesting to move a focus is being performed. Note that in an initial state the focus management unit 80 stores the ID of a GUI component indicated by certain information designating the GUI component to be focused on in the initial state. This certain information may be contained, for instance, in the GUI component information.

Note that the focus processing unit 70 refers to the ID in the focus management unit 80 as well as to the focus/not-focus classification information and the GUI component information to recognize which GUI component is currently being focused on, and determines a GUI component onto which the focus should move from the current GUI component using procedures that will be described later.

The focus display unit 90 displays, based on the ID in the focus management unit 80, a focus that is a dotted box enclosing the GUI component indicated by the ID on the GUI screen to show the user which GUI component is currently being focused on. The focus display unit 90 displays the focus after erasing the focus that was previously displayed.

On receiving an instruction from the focus processing unit 70, the content guide display unit 100 displays a content guide that explains a function of a GUI component currently being focused on on the GUI screen. The content guide display unit 100 displays the content guide after erasing the content guide that was previously displayed.

On receiving an instruction from the focus processing unit 70, the guide mark display unit 110 displays four guide marks that each indicate a GUI component that would be focused on if the user pressed one of the four direction buttons 1301–1304.

Note that the digital broadcast receiving device 1100 includes an image drawing control program, an image processor, or similar for setting the color of each pixel that composes the screen image. The GUI screen control system of the digital broadcast receiving device 1100 and components such as the focus display unit 90, the content guide display unit 100, and the guide mark display unit 110 display images such as GUI components and the focus by having this program or processor output an image signal from the digital broadcast receiving device 1100 to the monitor 1200 that displays the screen image.

GUI Screen

The following explains the GUI components that compose a GUI screen.

Figure 3:
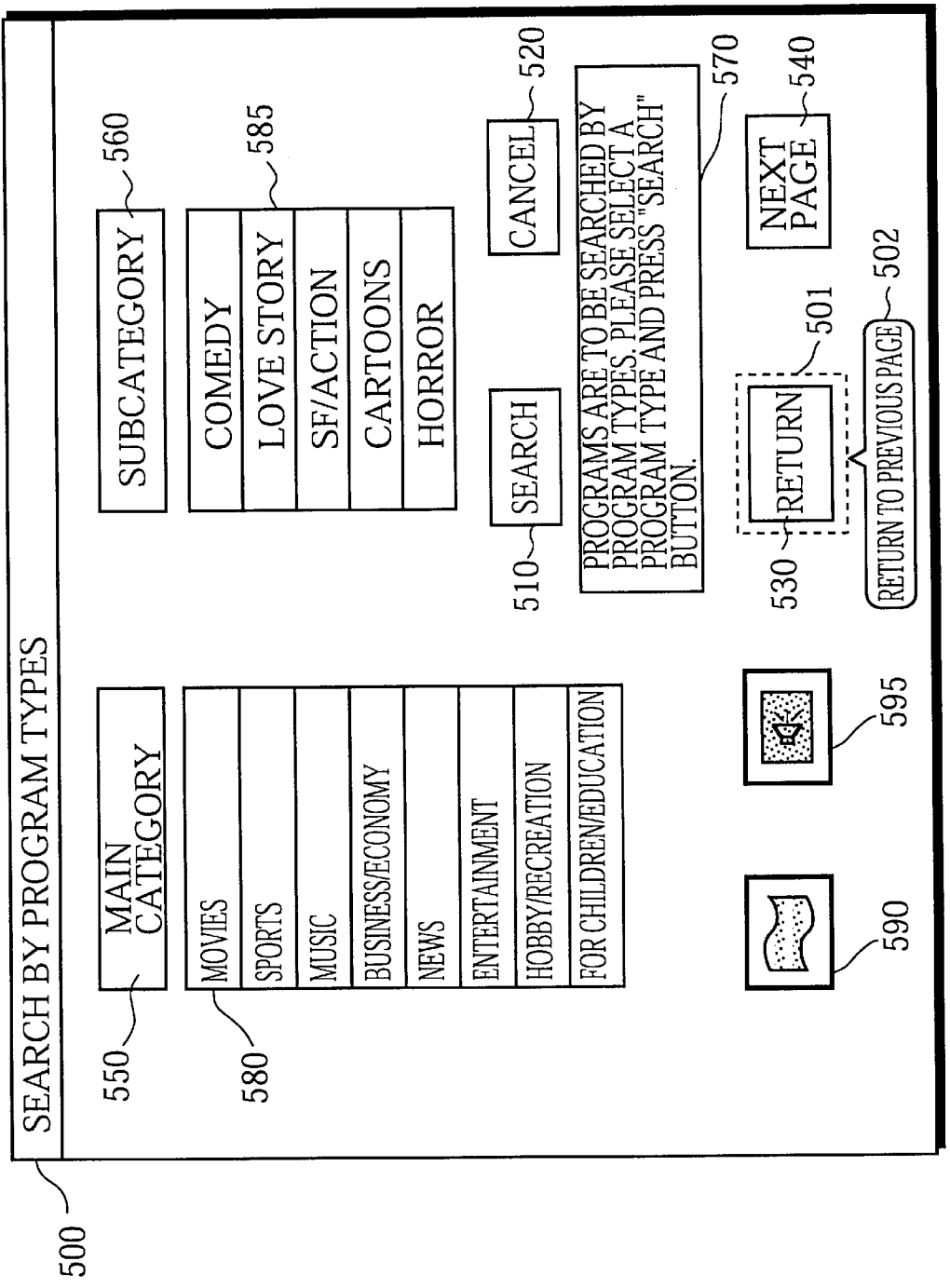
FIG. 3 shows an example of a GUI screen displayed on monitor 1200.

FIG. 3 shows an example of a GUI screen displayed by the monitor 1200. This GUI screen is provided for the user to search an electronic program guide (EPG) by program types. GUI components in the GUI screen can be classified as any of the following component types: a panel, a button, a label, a list box, or a bit-mapped image. Each component type is defined as follows.

A panel is a base on which other GUI components are displayed, and a label contains text enclosed in a box. A button receives a user operation, and if the user presses the button, a function that has been associated with the button is invoked. A bit-mapped image is an image but is assumed here to perform operations similar to that performed by a button. A list box includes a plurality of options that each contain text selectable by the user.

The GUI screen in FIG. 3 includes the following GUI components: a panel 500 as the background for other GUI components; a "Search" button 510; a "Cancel" button 520; a "Return" button 530, a "Next Page" button 540; a "Main Category" label 550; a "Subcategory" label 560; a label 570 giving an explanation of the GUI screen; a list box 580 containing a plurality of items that can be classified into the "Main Category" as one list; a list box 585 containing a plurality of items in the "Subcategory"; and bit-mapped images 590 and 595. A focus 501 and a content guide 502 are also displayed, and in FIG. 3, the focus 501 is positioned on the "Return" button 530.

Data Structure

The following explains focus/not-focus classification information in the focus/not-focus classification information management unit 50.

Figure 4:
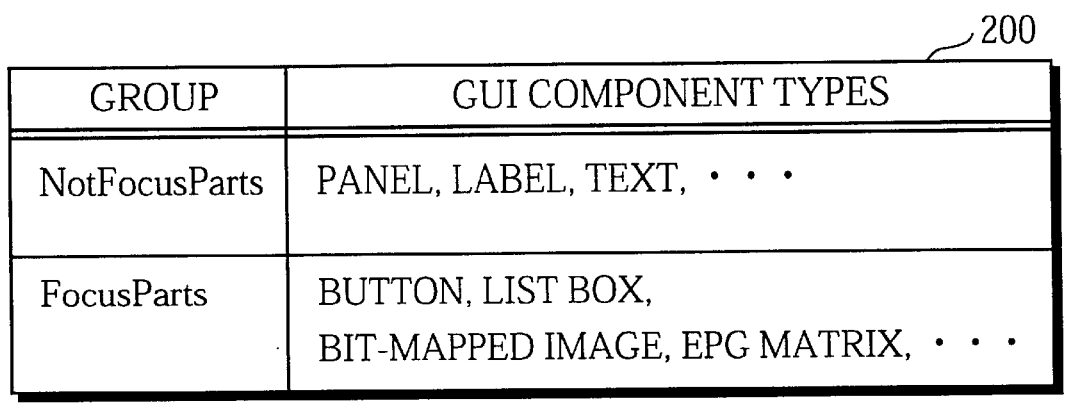
FIG. 4 shows focus/not-focus classification information 200 stored in focus/not-focus classification information management unit 50.

FIG. 4 shows contents of focus/not-focus classification information 200 that classifies all the GUT component types into either the "FocusParts" group or the "NotFocusParts" group according to whether each component type is permitted to be focused on. If a GUI component type has a predetermined function that is performed when the user selects the component, meaning the GUI component is selectable by the user, the GUI component type is classified into the "FocusParts" group. The GUI component types mentioned above refer to classifications based on how GUI components react to user operations. Examples of GUI component types are a list box and a button. Each GUI component is generated according to a template for one of the GUI component types by specifying attributes such as the display content and size.

In the focus/not-focus classification information 200, GUI component types such as a panel, a label, and a text are classified into the "NotFocusParts" group, and component types such as a button, a list box, a bit-mapped image, and an EPG matrix are into the "FocusParts" group. Here, text is a GUI component to display a character string, and the EPG matrix is a GUI component that displays a table showing broadcast programs arranged according to time and channel and receives a user selection of a program.

The following describes the GUI component information in the GUI component information management unit 60.

FIG. 5 shows contents of the GUI component information 400 that corresponds to the GUI screen shown in FIG. 3. GUI component information is provided for each GUT screen and is made up of a plurality of sets of specific component information that each define attributes of one particular GUI component such as a display position of the component and text or a picture to be displayed as a part of the component. The GUI component information 400 corresponds to the GUI screen shown in FIG. 3 and contains a plurality of sets of specific component information that correspond to the GUI components on the GUI screen in FIG. 3, although not all the specific component information is shown in FIG. 5. As shown in the figure, the GUI component information 400 includes sets of specific component information 410–440 that respectively correspond to the "Main Category" label 550, the "Search" button 510, the "Return" button 530, and the bit-mapped image 590 which are shown in FIG. 3.

For instance, the specific component information 410 contains attribute information on the "Main Category" label 550 is composed of GUI component ID "L001", a component type "Label", a display position "(90,60)" a component size "(170,40)", and text "Main Category" to be displayed as a part of the GUI component. Here, the display position "(90,60)" indicates the X and Y coordinates of the top right corner of the GUI component calculated with the top right corner of the GUI screen as the origin. The component size "(170,40)" indicates the width and the height of the GUI component. As other examples, the specific component information 420 for the "Search" button 510 contains attribute information composed of GUI component ID "B001", a component type "Button", a display position "(350,270)", a component size "(80,40)", text "Search" to be displayed as a part of the GUI component, a name "F_B001( )" of the function to be executed when the user selects the GUI component, and content guide ID "NONE" indicating that no content guide will be displayed for this GUI component. The specific component information 430 for the "Return" button 530 contains attribute information composed of GUI component ID "BO003", a component type "Button", a display position "(350,420)", a component size "(80,45)", text "Return" to be displayed as a part of the GUI component, a name "F_B003( )" of the function to be executed when the user selects the component, and content guide ID "G_B003" that specifies text displayed as the content guide for the GUI component.

Note that each set of specific component information contains GUI component attributes other than those shown in the figure such as a font type or a text size.

Processing of Focus Control Device 1

The following describes the processing of the focus control device 1.

FIG. 6 is the flowchart showing the processing that is repeatedly performed by the focus control device 1.

As shown in the flowchart, on receiving an event from the remote-control signal detection system in the digital broadcast receiving device 1100, the event receiving unit 10 notifies the event processing unit 20 of the received event (step S201). This event can be a focus operation event sent when the user presses one of the direction buttons 1301–1304 or the guide mark display button 1306, a GUI selection event sent when the user presses the selection button 1305, or the like.

The event processing unit 20 judges whether the received event is a focus operation event (step S202), and if so, the event processing unit 20 gives a parameter contained in the event to the focus processing unit 70 and requests the focus processing unit 70 to perform processing corresponding to the event.

The focus processing unit 70 then searches for GUI components that can be focused on, referring to the focus/not-focus classification information in the focus/not-focus classification information management unit 50 (step S203). In more detail, the focus processing unit 70 searches all the sets of specific component information in the GUI component information that corresponds to a GUI screen currently being displayed and extracts sets of specific component information that are classified into the "FocusParts" group.

The focus processing unit 70 then judges whether the parameter given by the event processing unit 20 indicates a direction out of up, down, right, and left (step S204), and if so, specifies one GUI component that should be focused on according to the parameter out of the GUI components that have been extracted in step S203. This processing to specify one GUI component will be explained later. The focus processing unit 70 then sends the ID of the specified GUI component to the focus management unit 80 (step S205).

Following this, the focus processing unit 70 instructs the focus display unit 90 to display a focus. The focus display unit 90 refers to the GUI component ID in the focus management unit 80 and displays the focus around the GUI component (step S206). Here, the displayed focus can vary according to the display position and the component size contained in specific component information on the GUI component.

The focus processing unit 70 then instructs the content guide display unit 100 to display a content guide so that the content guide display unit 100 refers to the GUI component ID in the focus management unit 80 and displays a content guide indicated by content guide ID in the specific component information corresponding to the GUI component ID that has been referred to (step S207). Here, the content guide display unit 100 only displays a content guide if a content guide ID is present in the specific component information.

On the other hand, if the received event is a focus operation event containing a parameter indicating that guide marks should be displayed, the focus processing unit 70 gives the "no" judgement in step S204. The focus processing unit 70 then specifies one GUI component that should be focused on according to each of the four directions, up, down, right, and left (step S208), and instructs the guide mark display unit 110 to display guide marks for the four directions. As a result, the guide mark display unit 110 displays marks such as "↑", "↓", "→", and "←" that point to the specified GUI components (step S209).

On judging that the received event is not a focus operation event in step S202, the event processing unit 20 requests the function call unit 40 to perform the processing corresponding to the received event (step S210). For instance, if the received event is a GUI selection event, the event processing unit 20 refers to the GUI component ID in the focus management unit 80, specifies a function indicated by specific component information on the GUI component, and requests the function call unit 40 to invoke the specified function. Execution of such a function may involve having the GUI management unit 30 update focus/not-focus classification information or GUI component information that may result in a current GUI screen being replaced with another, or changes to the display positions of GUI components or the GUI component types permitted to be focused on.

For instance, if the function call unit 40 invokes a function whose execution involves adding a new button that should be displayed, the GUI management unit 30 appends new specific component information on the new button to the GUI component information in the GUI component information management unit 60. Alternatively, if the function call unit 40 invokes a function whose execution involves prohibiting the bit-mapped image type from being focused on, then the GUI-management unit 30 updates focus/not-focus classification information in the focus/not-focus classification information management unit 50 to classify the bit-mapped image type into the "NotFocusParts" group. The GUI management unit 30 can also change positions of sets of specific component information or attribute information such as component size in the GUI component information. When the focus/not-fucus classification information or GUT component information has been updated in this way, the focus processing unit 70 performs its processing based on the updated information.

In this way, the focus control device 1 starts the processing shown in FIG. 6 each time the event receiving unit 10 receives an even in response to the user's pressing a button on the remote controller or the like.

Figure 7:
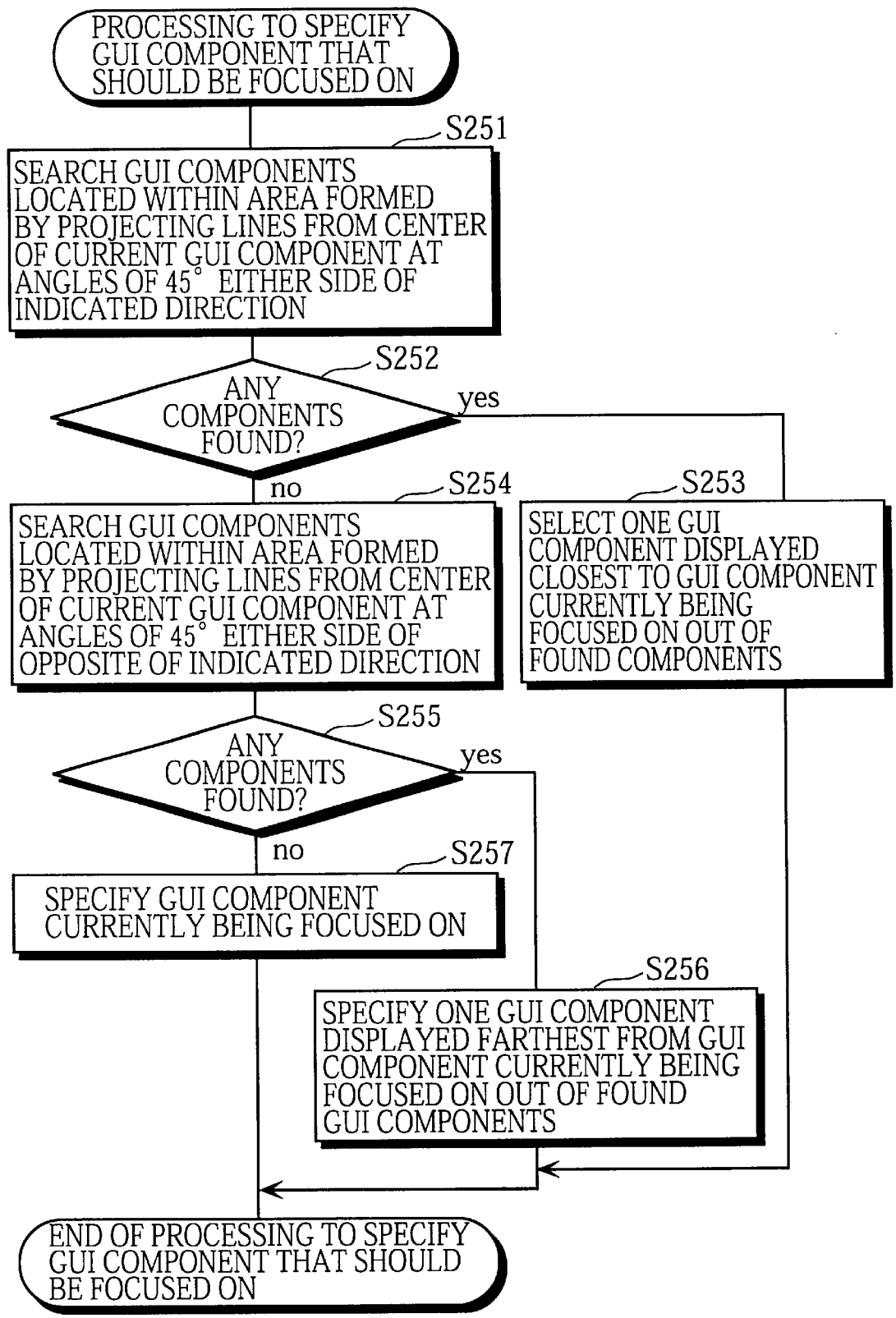

The following specifically explains the processing in steps S205 and S208 to specify one GUI component that should be focused on according to each of the directions, up, down, right, and left with reference to the flowchart of FIG. 7 showing this processing.

The focus processing unit 70 refers to the GUT component ID in the focus management unit 80 and the GUI component information in the GUI component information management unit 60 and searches, out of the GUI components that have been searched in step S203, GUI components whose centers are located within an area formed by projecting lines from the center of a GUI component currently being focused on at angles that are 45° either side of the indicated direction. (step S251). The focus processing unit 70 can obtain the center of each GUI component by referring to the display position and component size indicated by the specific component information in the GUI component information.

On finding GUI components through the search in step S251, the focus processing unit 70 gives the "yes" judgement (step S252), and specifies, out of the searched GUT components, the GUI component displayed closest to the GUT component currently being focused on (step S253). The processing is then terminated.

Note that in step S253 when the two or more GUI components are displayed at an equal shortest distance from the GUI component currently being focused on, the focus processing unit 70 selects only one component according to a predetermined method. For instance, the focus processing unit 70 may select the GUI component that was found latest in step S251.

On finding no GUI components in step S251, the focus processing unit 70 gives the "no" judgement (step S252), and searches, out of the GUI components that have been searched in step S203, GUI components whose centers are located within an area formed by projecting lines from the center of a GUI component currently being focused on at angles that are 45° either side of the opposite of the indicated direction. (step S254). For instance, if the indicated direction is "up", the search is performed downward.

On finding GUI components through the search in step 254, the focus processing unit 70 gives the "yes" judgement (step S255), and specifies, out of the found GUI components, the GUI component displayed farthest from the GUI component currently being focused on (step S256). Note that in step S256 even when the two or more GUI components are displayed at an equal longest distance from the GUI component currently being focused on, the focus processing unit 70 selects only one component according to a predetermined method. For instance, the focus processing unit 70 may select one GUI component that was found latest in step S254 and is displayed farthest from the GUI component currently being focused on.

On the other hand, on finding no GUI components in the search in step S254, the focus processing unit 70 gives the "no" judgement (step S255), and specifies the GUI component currently being focused on (step S257). The processing is then terminated.

The following explains the processing of the focus control device 1 using specific examples. Here, assume that the focus/not-focus information management unit 50 and the GUI component information management unit 60 store the focus/not-focus information and the GUI component information shown in FIGS. 4 and 5, and that the user presses the direction button 530 indicating the up direction when the GUI screen is as shown in FIG. 3 in which the "Return" button 530 is currently being focused on.

On receiving a remote-control signal for the press of the direction button 1301 from the remote controller 1300, the remote-control signal detection system in the digital broadcast receiving device 1100 notifies the event receiving unit 10 of a focus operation event containing the up direction as a parameter.

On receiving the focus operation event (step S201), the event receiving unit 10 notifies the event processing unit 20 of the focus operation event, the event processing unit 20 then judges that the received event is a focus operation event (step S202), gives a parameter contained in the focus operation event to the focus processing unit 70, and requests the focus processing unit 70 to perform processing corresponding to the event.

The focus processing unit 70 then refers to the focus/not-focus classification information in the focus/not-focus classification information management unit 50 and searches the GUI component information in the GUI component information management unit 60 for specific component information on GUI components permitted to be focused on (step S203). As a result, GUI components of types of a button, a list box, and a bit-mapped image have been extracted (see FIG. 4).

In more detail, all the specific component information in FIG. 5 except for specific component information 410 is extracted. In FIG. 3, the following GUT components are extracted: the "Search" button 510; the "Cancel" button 520; the "Return" button 530; the "Next Page" button 540; the bit-mapped images 590 and 595; and the list boxes 580 and 585. The "Main Category" label 550, the "Subcategory" label 560, and the label 570 are not extracted.

The focus processing unit 70 then judges that the parameter given by the event processing unit 20 indicates the up direction and so gives the "yes" judgement (step S204). The focus processing unit 70 then specifies one GUI component that should be focused on according to the up direction out of the searched components using the procedure shown in the flowchart of FIG. 7 (step S205).

Specifically, the focus processing unit 70 specifies the "Search" button 510 displayed above the "Return" button 530 currently being focused on as the next GUI component to be focused on, and the focus management unit 80 stores the GUI component ID of the "Search" button 510. Here, the focus processing unit 70 does not specify the label 570 displayed closest to the "Return" button 530, as the label 570 was not extracted thorough the search in step S203.

The focus processing unit 70 then instructs the focus display unit 90 to display a focus so that a focus enclosing the specified "Search" button 510 is displayed (step S206). In this way, the focus moves from the "Return" button 530 onto the "Search" button 510.

Following this, the focus processing unit 70 instructs the content guide display unit 100 to display a content guide for the "Search" button 510. However, as the specific component information 420 for the "Search" button 510 does not contain a content guide ID as shown in FIG. 5, the focus processing unit 70 does not display a content guide.

The following specifically describes the processing performed by the focus control device 1 when the user has pressed the guide mark display button 1306 and the GUI screen is as shown in FIG. 3 in which the "Return" button 530 is focused on.

In this case, the event receiving unit 10 receives a focus operation event containing parameters indicating that guide marks should be displayed from the remote-control signal detection system. In response to this focus operation event, the focus control device 1 performs the processing from steps S201–S203 in the same way as described for the case when the user presses the direction button 1301.

Following this, the focus processing unit 70 judges that the parameter given by the event processing unit 20 does not indicate a direction, and so gives the "no" judgement (step S204). The focus processing unit 70 then repeats the processing shown in FIG. 7 to specify four GUI components that would be focused on if the four direction buttons 1301–1304 for up, down, right, and left were pressed (step S208). The guide mark display unit 110 then displays guide marks for the four directions that point to the specified GUI components (step S209).

Figure 8:
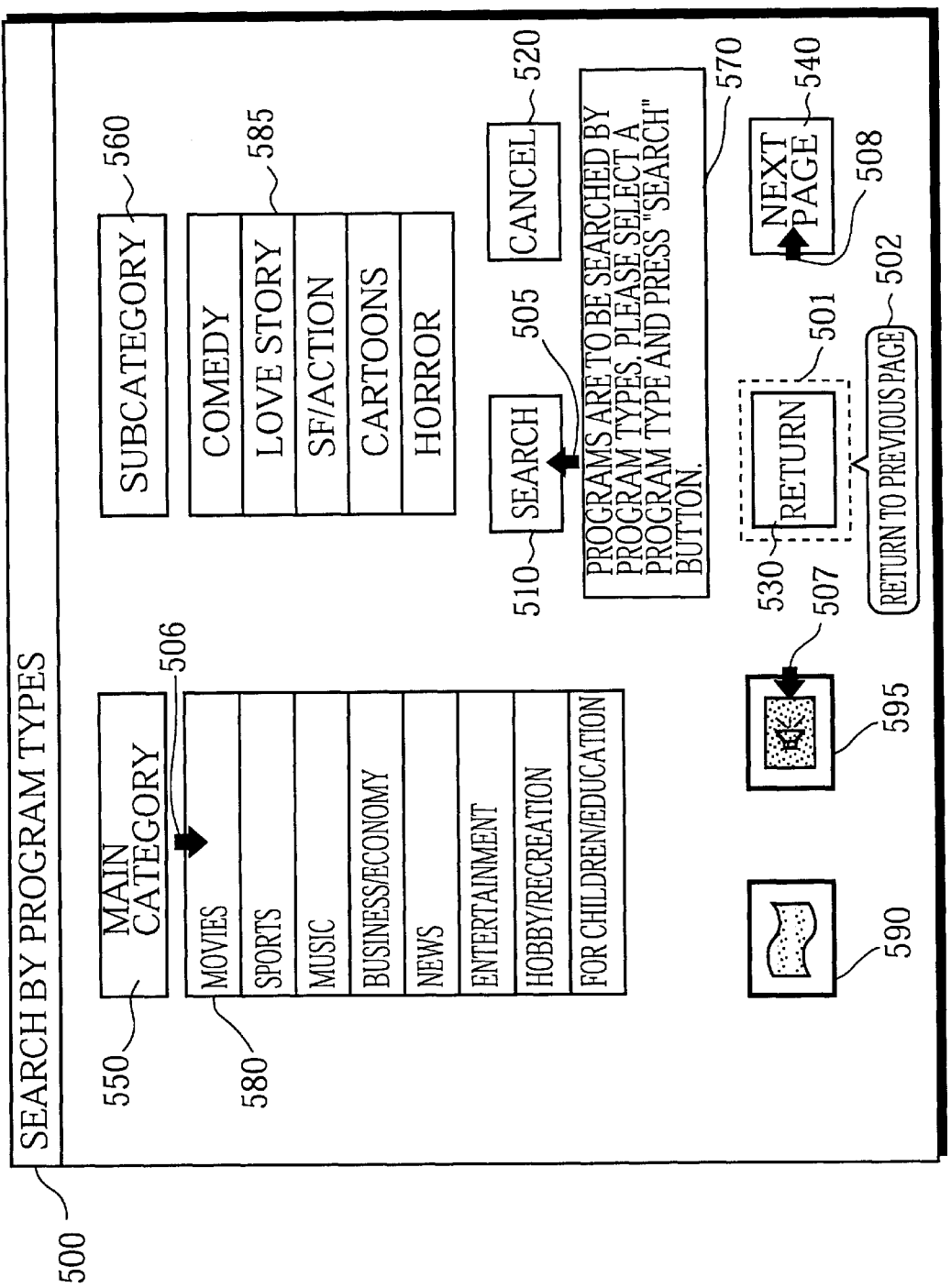
FIG. 8 shows a GUI screen in which guide marks are displayed.

FIG. 8 shows the GUI screen on which the guide marks represented by arrows 505–508 are displayed. Here, if the user presses one of the direction buttons 1301–1304, the focus moves onto the GUI component to which the corresponding arrow currently points.

As has been described, the focus control device 1 moves a focus only onto GUI components that are selectable at that point. As a result, the number of user operations required to move the focus onto a desired GUI component can be reduced. The focus control device 1 can perform the above focus control even when the GUI screen is replaced with a new screen such as shown in FIG. 9 as a result of execution of a function by the function call unit 40.

Figure 9:
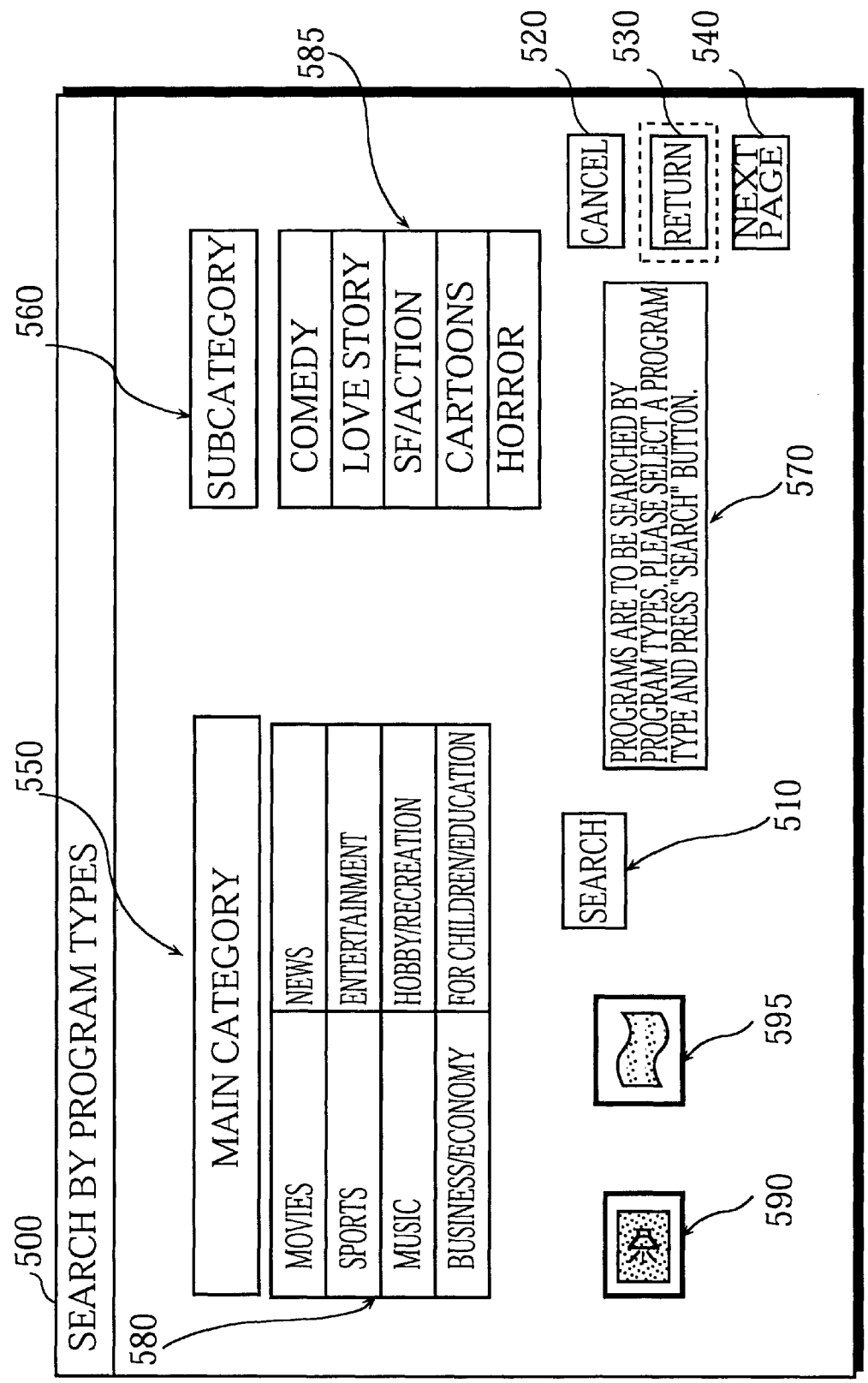
FIG. 9 shows a GUI screen in which positions of GUI components have changed.

Compared with the GUI screen shown in FIGS. 3 or 8, the GUI screen in FIG. 9 is wider and displays the same GUI components on different positions. If the user presses the direction button 1303 when the "Return" button 530 is focused on as shown, the focus control device 1 moves the focus onto the "Search" button 510 after skipping over the label 570.

GUI Screen Information Generating Device

The following explains a GUI screen information generating device that generates the GUI screen information used by the focus control device 1.

Figure 10:
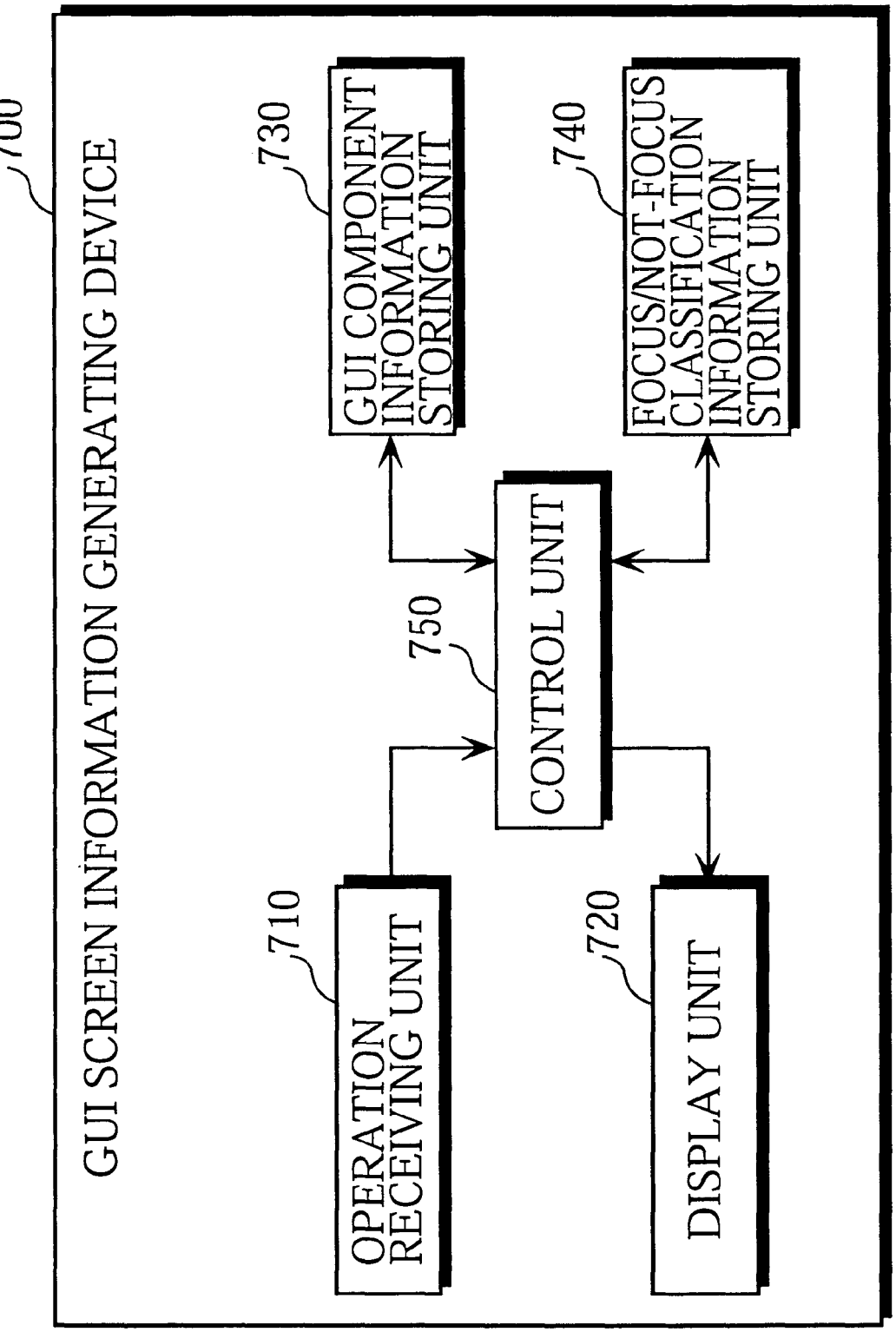
FIG. 10 is a block diagram showing the functional construction of a GUI screen information generating device.

FIG. 10 is a block diagram showing the functional construction of the GUI screen information generating device 700. This GUI screen information generating device 700 is used by an operator who designs GUI screens and achieved by hardware such as a computer that contains a CPU, a memory, a hard disk, a mouse, and a display. In terms of functions, the GUI screen information generating device 700 includes an operation receiving unit 710, a display unit 720, a GUI component information storing unit 730, a focus/not-focus classification information storing unit 740, and a control unit 750. Functions of these units are performed by having the CPU execute programs in the memory.

The operation receiving unit 710 receives an operation from the operator via an input unit such as a mouse, and the display unit 720 displays data on a screen. The control unit 750 performs main operations to generate GUI component information and focus/not-focus classification information by (1) having the display unit 720 display data such as a GUI screen that prompts and receives an operator's operation, (2) receiving the operator's operation via the operation receiving unit 710, (3) generating GUI component information and focus/not-focus classification information based on the received operation, and (4) storing the generated information into the GUI component information storing unit 730 and the focus/not-focus classification information storing unit 740.

The operator inputs sets of specific component information that each correspond to a GUI component as stated earlier (see FIG. 5) so that the GUI screen information generating device 700 generates GUI component information.

Figure 11:
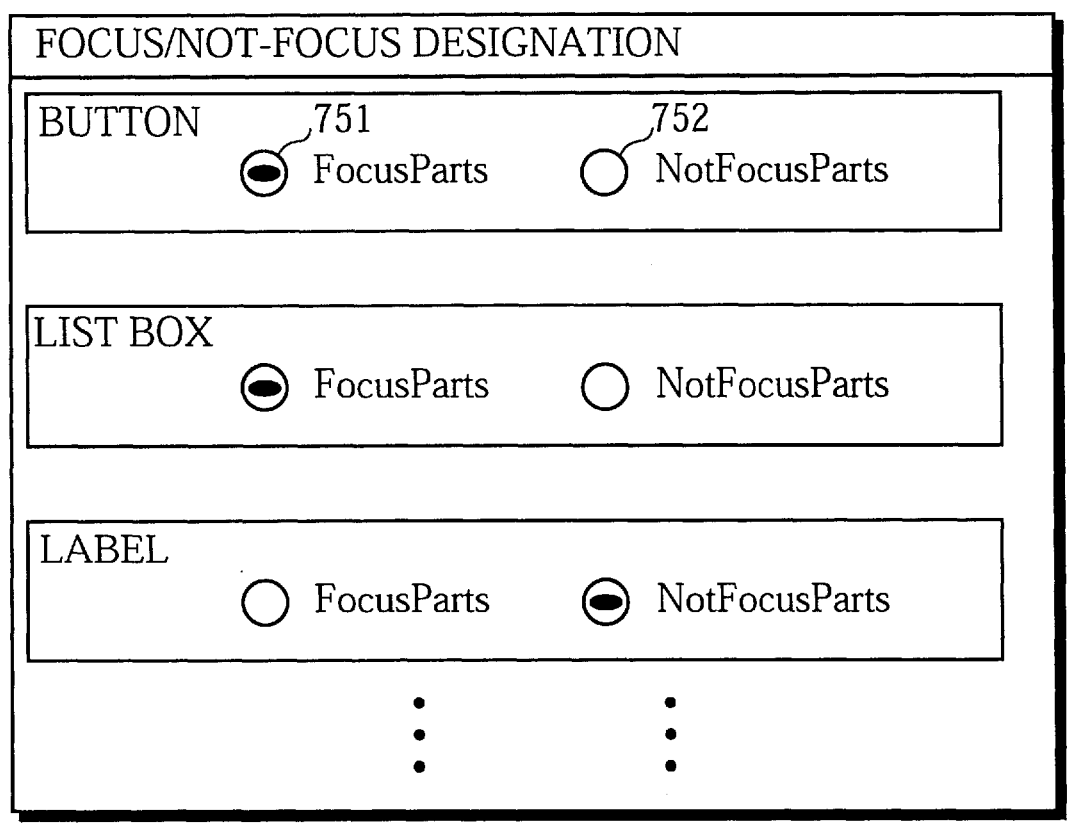
FIG. 11 shows a screen displayed by the GUI screen information generating device to generate focus/not-focus classification information.

To generate focus/not-focus classification information, the display unit 720 displays a GUI screen shown in FIG. 11 to have the operator designate whether each component type, such as a button, a list box, and a label, should be classified into the "FocusParts" group or the "NotFocusParts" group. For instance, the operator clicks either a mark 751 or a mark 752 with a mouse to designate whether to permit a button to be focused on.

SECOND EMBODIMENT

The second embodiment relates to a modified focus control device and a modified GUI screen information generating device that are example modifications to the focus control device 1 and the GUI screen information generating device 700 according to the first embodiment.

Modified GUI Component Information

The following describes an example modification to GUI component information described in the first embodiment.

FIG. 12 shows contents of modified GUI component information 800, which contains a plurality of sets of specific component information as in the GUI component information 400 shown in FIG. 5 but differs from the GUI component information 400 in that each set of specific component information for the present embodiment also contains a focus attribute.

A focus attribute is a value indicating whether a GUI component can be focused on. If so, the value is given as "Permitted" in FIG. 12, or if not, it is given as "Not Permitted". For instance, specific component information 810 contains the focus attribute "Not Permitted", and specific component information 820, 830, and 840 the focus attribute "Permitted".

The Modified GUI Screen Information Generating Device

The modified GUI screen information generating device of the present embodiment differs from the GUI screen information generating device 700 in that the GUI component information storing unit 730 of the present embodiment stores the modified GUI component information and that the control unit 750 performs different processing.

The following explains the processing of the control unit 750. The control unit 750 receives a designation from the operator that indicates whether each GUI component type is permitted to be focused on, generates focus/not-focus classification information, and sets a focus attribute in each set of specific component information based on the generated focus/not-focus classification information to generate the modified GUI component information. Here, the control unit 750 does not have to generate such focus/not-focus classification information if the predetermined focus/not-focus classification information has been provided in advance and stored in the focus/not-focus classification information storing unit 740.

For instance, when the focus/not-focus classification information indicates that a component type of a button is classified into the "FocusParts" group and the operator instructs to generate a button, the control unit 750 sets "Permitted" as a focus attribute in the specific component information for the button.

Here, note that the operator is allowed to set a focus attribute of each GUI component in specific component information regardless of focus/not-focus classification information stored in the focus/not-focus classification information storing unit 740. This can be realized, for instance, by having the control unit 750 display a GUI screen that can receive an operator's operation to change a focus attribute in specific component information. For example, it is possible to set a focus attribute "Not Permitted" in specific component information on a particular button.

The modified focus control device uses modified GUI component information that has been generated in this way so that it controls whether each GUI component can be focused on according not to focus/not-focus classification information determined by a component type of the GUI component but to the focus attribute of each GUI component.

Modified Focus Control Device

The modified focus control device of the present embodiment differs from the focus control device 1 of the first embodiment in the following points. First, the GUT component information management unit 60 of the present embodiment stores the modified GUI component information. Second, although the focus processing unit 70 of the first embodiment refers to both focus/not-focus classification information and GUI component information to search for GUI components that can be focused on (step S203), the focus processing unit 70 of the present embodiment refers to a focus attribute in specific component information in the modified GUI component information for this search.

Note that the GUI management unit 30 in the modified focus control device is capable of changing specific component information in the modified GUI component information such as a focus attribute, a display position, or a component size. If certain processing to be performed in response to a user selection of a GUI component can be no longer performed as a result of execution of a function by the function call unit 40, the GUI management unit 30 can change a focus attribute in the specific component information on the selected GUI component from "Permitted" to "Not Permitted", or from "Not Permitted" to "Permitted", if it becomes possible to perform the certain processing in response to the user selection. As a result of this processing by the GUI management unit 30, if a button is provided for the user to instruct to perform certain processing and the certain processing cannot be currently performed, for example, then the button is set as being incapable of being focused on, or if the certain processing can be currently performed, the button is set as being capable of being focused on.

Supplementary Explanation

The above embodiments have been used to describe the focus control device of the present invention, although it should be clear that the present invention is not limited to these embodiments. Possible modifications are described below.

1. The above embodiments describe the focus control device as being built into a GUI screen control system in a digital broadcast receiving device, although the present focus control device can be alternatively provided in other devices including household electrical appliances or personal computers that can display a GUI screen and that include an input unit such as a remote controller or a keyboard that cannot directly point to-a given area in the GUI screen.

The present invention is not limited to the use of a remote controller with four buttons indicating up, down, left and right.

In the above embodiments, GUI component information and focus/not-focus classification information are contained in digitally broadcast contents and transferred by a broadcast satellite or the like. However, the GUI component information and the focus/not-focus classification information may be stored in the focus control device in advance instead.

2. The above embodiments show a button, a list box, and a label, or the like as GUI component types, although GUI component types are not limited to such and may include other component types such as a check box and an input field.

3. In the above embodiments, focus display unit 90 displays a focus represented by a dotted box, although a focus may be represented by other forms, such as a highlight, provided the user can recognize the intended area as currently being focused on. It is also possible to represent a focus on a button by a dotted box and a focus on an item in a list box by a highlight.

4. In the above embodiments, the processing to specify one GUI component that should be focused on is performed according to the procedure shown in FIG. 7, although this procedure is merely an example, and other procedures may be used instead. For instance, a procedure that omits steps S254–S256 may be alternatively used. A GUI component currently being focused on is specified in step S257, although it is possible to give a judgement that no GUI components that should be focused on exist in step S257 and to neither move a currently displayed focus nor display a guide mark indicating the direction.

The focus control device and the modified focus control device of the first and second embodiments search and extract all the GUI components that are permitted to be focused on and then specify one component that should be focused on out of the extracted GUI components, although other procedures may be alternatively used to specify the GUI component that should be focused on. For instance, the focus control device or the modified focus control device may find a GUI component that should be focused on by detecting one GUI component that is displayed in the indicated direction and closest to a GUI component currently focused on and judging if the detected GUI component is permitted to be focused on. If not, the focus control device or the modified focus control device may repeat the above detection until a GUI component that is permitted to be focused on is found.

To specify one GUI component that should be focused on, each set of specific component information in the GUI component information management unit 60 may store an identification number so that a focus moves according to identification numbers assigned to each GUI component displayed on a GUI screen. For instance, identification numbers "1" to "10" may be assigned to GUI components displayed on the GUI screen from left to right to move the focus from one GUI component to another in this ascending order. Here, if the user presses a direction button for right direction when the third GUI component from the left is currently focused on, for instance, then the focus moves to the GUI component with the lowest ID number that exceeds 5. The above embodiments state that the guide mark display unit 110 displays the guide marks when the user presses the guide mark display button 1306, although the focus marks may be displayed each time a focus moves to a different GUI component.

Focus marks are not limited to the arrows "↑", "↓", "←", and "→" used in the above embodiments and may be other marks indicating GUI components that would be focused on.

6. The modified GUI screen information generating device of the second embodiment may add information to specify GUI components that would be focused on in response to the inputted directions composed of up, down, left, and right to each set of specific component information. This is to say, after generating focus/not-focus classification information and modified GUI component information, the modified GUI screen information generating device may refer to the generated modified GUI component information, and specify GUI components that would be focused on in response to inputted directions composed of up, down, left, and right using a procedure similar to that the modified focus control device uses for specifying GUI components to which the guide marks point. The modified GUI screen information generating device then may add information indicating the specified GUT components as focus destination information to specific component information. The modified focus control device then may move a focus according to focus destination information added to each set of specific component information while skipping over GUI components where the focus cannot be positioned without dynamically determining a GUI component that can be focused on as in the above embodiments.

7. The procedures of the focus control device 1 and the modified focus control device such as shown in the flowcharts of FIGS. 6 and 7 of the above embodiments may be achieved by programs in machine language, with recording media storing these programs being distributed and sold. These recording media can be IC cards, optical discs, flexible discs, ROMS, or other media, with the machine language programs recorded on the media being installed into a general-purpose computer or a household electric appliance. This general-purpose computer or a household electric appliance executes the installed machine language programs, thereby realizing the focus control device and the modified focus control device of the above embodiments.

Also, computer programs to have general-purpose computers or household electric appliances perform the procedures of the above focus control device and the modified focus control device may be distributed and sold online using communication lines and recording media such as hard disks.

What is claimed is:

1. A focus control device that positions a focus on one of a plurality of graphical user interface (GUI) components displayed on a screen comprising:

request receiving means for receiving a request to move the focus;

focus permission information storing means for storing focus permission information indicating, for each GUI component, whether the GUI component is permitted or prohibited to be focused on, the permission or prohibition being given to each GUI component independently of a type of the GUI component, the type of GUI component being determined based on an attribute of the GUI component aside from whether the GUI component can be focused on; and focus moving means for, in response to the received request, searching a plurality of GUI components displayed on the screen to extract all GUI components that can be focused on according to the focus permission information, specifying one of the extracted GUI components according to the received request, and moving the focus to the specified GUI component.

2. The focus control device of claim 1, further comprising component position information storing means for storing position information indicating a display position of each GUI component on the screen wherein the request received by the receiving means contains information indicating a direction in which the focus should move and wherein the focus moving means moves the focus by referring to the position information and the indicated direction to specify, out of GUI components on which the focus can be positioned, one GUI component to which the focus should move from a GUI component on which the focus is currently positioned, and by positioning the focus on the specified GUI component.

3. The focus control device of claim 2, further comprising component position information changing means for changing the position information, wherein the focus moving means moves the focus referring to position information in the component position information storing means when the request receiving means received the request.

4. The focus control device of claim 3, further comprising focus permission information changing means for changing the focus permission information, wherein the focus moving means moves the focus referring to focus permission information in the focus permission information storing means when the request receiving means received the request.

5. The focus control device of claim 4, further comprising focus destination display means for selectively displaying a mark indicating a GUI component to which the focus moving means would move the focus if the request receiving means received the request.

6. The focus control device of claim 1, further comprising focus permission information changing means for changing the focus permission information, wherein the focus moving means moves the focus referring to focus permission information in the focus permission information storing means when the request receiving means received the request.

7. The focus control device of claim 1, further comprising focus destination display means for selectively displaying a mark indicating a GUI component to which the focus moving means would move the focus if the request receiving means received the request.

8. A computer-readable recording medium that stores a control program to have a computer containing a memory perform focus control processing to move a focus to one of a plurality of GUI components displayed on a screen, wherein the memory stores focus permission information indicating, for each GUI component, whether the GUI component is permitted or prohibited to be focused on, the permission or prohibition being given to each GUI component independently of a type of the GUI component, the type of GUI component being determined based on an attribute of the GUI component aside from whether the GUI component can be focused on, and wherein the focus control processing comprises a request receiving step for receiving a request to move the focus and a focus moving step for, in response to the received request, searching a plurality of GUI components displayed on the screen to extract all GUI components that can be focused on according to the focus permission information, and specifying one of the extracted GUI components according to the received request, and moving the focus to the specified GUI component.

9. The computer-readable recording medium of claim 8, wherein the memory stores position information indicating a display position of each GUI component on the screen, wherein the request received in the receiving step contains information indicating a direction in which the focus should move and wherein the focus moving step moves the focus by referring to the position information and the indicated direction to specify, out of GUI components on which the focus can be positioned, one GUI component to which the focus should move from a GUI component on which the focus is currently positioned, and by positioning the focus on the specified GUI component.

10. The computer-readable recording medium of claim 9, wherein the focus control processing further comprises a focus destination display step for selectively displaying a mark indicating a GUI component to which the focus would be moved in the focus moving step if the request were received in the request receiving step.

11. A focus control device that positions a focus on one of a plurality of GUI components displayed on a screen comprising:

request receiving means for receiving a request to move the focus;

focus permission information storing means for storing focus permission information indicating, for each component, whether the GUI component is permitted or prohibited to be focused on, the permission or prohibition being given to each GUI component independently of a type of the GUI component, the type of GUI component being determined based on an attribute of the GUI component aside from whether the GUI component can be focused on; and focus moving means for (i) targeting one of the GUI components according to the received request to judge with references to the focus permission information whether the targeted GUI component can be focused on, wherein if it is judged that the targeted component cannot be focused on, the targeting is repeated until it is judged that the targeted GUI component can be focused on, and (ii) moving the focus to the targeted GUI components that can be focused on.

12. A recording medium storing a control program to have a computer containing a memory perform focus control processing to move a focus to one of a plurality of GUI components displayed on a screen, wherein the memory stores focus permission information storing means for storing focus permission information indicating, for each GUI component, whether the GUI component is permitted or prohibited to be focused on, the permission or prohibition being given to each GUI component independently of a type of the GUI component, the type of GUI component being determined based on an attribute of the GUI component aside from whether the GUI component can be focused on, the focus control processing comprises:

a request receiving step for receiving a request to move the focus; and a focus moving step for (i) targeting one of the GUI components according to the received request to judge with reference to the focus permission information whether the targeted GUI component can be focused on, wherein if it is judged that the currently targeted component cannot be focused on, the targeting is repeated until it is judged that the targeted GUI component can be focused on, and (ii) moving the focus to the targeted GUI component that can be focused on.

* * * * *